(12) United States Patent
Lewis et al.

(10) Patent No.: US 10,926,626 B2
(45) Date of Patent: Feb. 23, 2021

(54) HOOD GUARD (71) Applicant: Creative Alloy Products Co., Plantersville, TX (US)

(72) Inventors: William Lewis, Plantersville, TX (US); Chris W Lewis, Plantersville, TX (US)

( * ) Notice: Subject to any disclaimer, the term of this patent is extended or adjusted under 35 U.S.C. 154(b) by 0 days.

(21) Appl. No.: 16/540,264

(22) Filed: Aug. 14, 2019

(65) Prior Publication Data
US 2019/0366837 A1 Dec. 5, 2019

Related U.S. Application Data (63) Continuation-in-part of application No. 15/910,003, filed on Mar. 1, 2018.

(60) Provisional application No. 62/465,627, filed on Mar. 1, 2017.

(51) Int. Cl.
*B60K 15/05* (2006.01)
*B60S 5/00* (2006.01)

(52) U.S. Cl.
CPC ............. *B60K 15/05* (2013.01); *B60S 5/00* (2013.01)

(58) Field of Classification Search
CPC .... H05K 5/03; B60K 15/05; B60K 2015/053; B60K 2015/0523; H02G 3/14; H02G 3/081; E02F 9/2275; E02F 9/2271
USPC ............ 285/154.1; 174/50.51; 220/244, 245, 220/327, 811, 815, 3.8
See application file for complete search history.

(56) References Cited

U.S. PATENT DOCUMENTS

| | | | | |
|---|---|---|---|---|
| 1,384,915 A | * | 7/1921 | Parks | F16J 13/02 220/327 |
| 1,682,371 A | * | 8/1928 | Crossley | F21L 19/00 220/327 |
| 2,613,312 A | * | 10/1952 | Vinal | F24H 9/1818 220/327 |
| 2,943,137 A | * | 6/1960 | Wyngarden | H02G 3/20 174/61 |
| 3,965,287 A | * | 6/1976 | Mueller | H05K 5/03 220/266 |
| 4,032,030 A | * | 6/1977 | Bass | H02G 3/14 220/241 |
| 4,399,922 A | * | 8/1983 | Horsley | H02G 3/125 220/3.9 |
| 4,426,126 A | * | 1/1984 | De Vos | F21V 21/03 248/222.51 |
| 4,494,666 A | * | 1/1985 | Cooper | F17C 13/123 220/327 |
| 4,603,789 A | * | 8/1986 | Medlin, Sr. | H02G 3/125 220/3.9 |
| 5,868,558 A | * | 2/1999 | Parker | F01C 21/108 220/327 |

(Continued)

Primary Examiner — David Bochna
(74) Attorney, Agent, or Firm — Shannon Warren (57) ABSTRACT A guard plate for selectively covering a protected surface, wherein: the guard plate comprises a plurality of fasteners, a plate body. The plate body comprises a first side edge, a second side edge, a curved top edge, a lower edge, a back side, a front side, the guard plate comprises at least a first lower bolt hole arranged along the lower edge of the guard plate. proximate to the curved top edge, the guard plate comprises a first upper indention and a second upper indention, each configured to receive a portion of a first upper fastener and a second upper fastener, respectively. The guard plate comprises a rotational origin created by rotating the guard plate around a first lower fastener in the first lower bolt hole.

5 Claims, 7 Drawing Sheets (56) References Cited

U.S. PATENT DOCUMENTS

| | | | | |
|---|---|---|---|---|
| 6,161,727 A | * | 12/2000 | Gordon | B65D 43/02 |
| | | | | 220/327 |
| 8,666,609 B2 | * | 3/2014 | Iida | E02F 9/2275 |
| | | | | 701/50 |
| 9,371,962 B2 | * | 6/2016 | Korcz | H02G 3/20 |
| 10,704,231 B1 | * | 7/2020 | Iizuka | E02F 9/2275 |

* cited by examiner

HOOD GUARD

CROSS-REFERENCE TO RELATED APPLICATIONS

This application claims benefit to U.S. patent application Ser. No. 15/910,003 filed on Jan. 3, 2018 (pending) which in turn claims benefit to 62/465,627 filed on Jan. 3, 2017. The current design was disclosed in the older application '627. Both prior applications are hereby incorporated by reference.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A guard plate 102 for selectively covering a protected surface 520. Said guard plate 102 comprises a plurality of fasteners 708, and a plate body 102. Said plate body 102 comprises a fastener catch 522, a fastener indention 518, a second side edge 516, a first side edge 514, a lower edge 512, a fastener catching extension 510, a curved top edge 506, a rotational origin 504, a rotational radius 502, a first lower bolt hole 116a, a back side 114, a front side 112, a first upper indention 104, a second upper fastener 708b, and a first upper fastener 708a. Said guard plate 102 is configured to allow said plate body 102 to rotate around said second upper fastener 708b below said first upper fastener 708a to selectively cover and uncover said protected surface 520. Said plate body 102 is selectively held against a portion of said protected surface 520 with said second upper fastener 708b through said first lower bolt hole 116a. Said second upper fastener 708b is loosened to allow said plate body 102 to rotate. Said first upper fastener 708a is loosened to allow said plate body 102 to rotate away from said first upper fastener 708a. Said curved top edge 506 follows said rotational radius 502 to ensure said first upper fastener 708a can pass around without getting caught. Said curved top edge 506 comprises said fastener catching extension 510 extending up at said first upper indention 104 and forming said fastener catch 522. Said fastener catch 522 comprises at least a half circular cut out from said fastener catching extension 510 which selectively receives and holds a portion of said first upper fastener 708a to selectively hold or release said first upper fastener 708a to said first upper indention 104. A liquid additive portal 710 of a vehicle is on said protected surface 520. Said liquid additive portal 710 can receive maintenance fluids, but said guard plate 102 can discourage users from accidentally adding fuels into said liquid additive portal 710 and thereby protect said vehicle. Said guard plate 102 further comprises a first lower fastener 712a. Said plate body 102 further comprises a second upper indention 106. Said second upper indention 106 comprises a slotted opening in said second side edge 516 open to a first side 528 along a second rotational path 526 and closed on a second side 530 with a second fastener catch 532. A second rotational radius 524 can define a distance between said rotational origin 504 and a center point of said second upper indention 106. exposing said liquid additive portal 710 can further comprise loosening said second upper fastener 708b and rotating said plate body 102 around said rotational origin 504 away from said second upper fastener 708b.

Said guard plate 102 for selectively covering said protected surface 520. Said guard plate 102 comprises said plurality of fasteners 708, and said plate body 102. Said plate body 102 comprises said fastener catch 522, said fastener indention 518, said second side edge 516, said first side edge 514, said lower edge 512, said fastener catching extension 510, said curved top edge 506, said rotational origin 504, said rotational radius 502, said first lower bolt hole 116a, said back side 114, said front side 112, said first upper indention 104, said second upper fastener 708b, and said first upper fastener 708a. Said guard plate 102 is configured to allow said plate body 102 to rotate around said second upper fastener 708b below said first upper fastener 708a to selectively cover and uncover said protected surface 520. Said plate body 102 is selectively held against a portion of said protected surface 520 with said second upper fastener 708b through said first lower bolt hole 116a.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
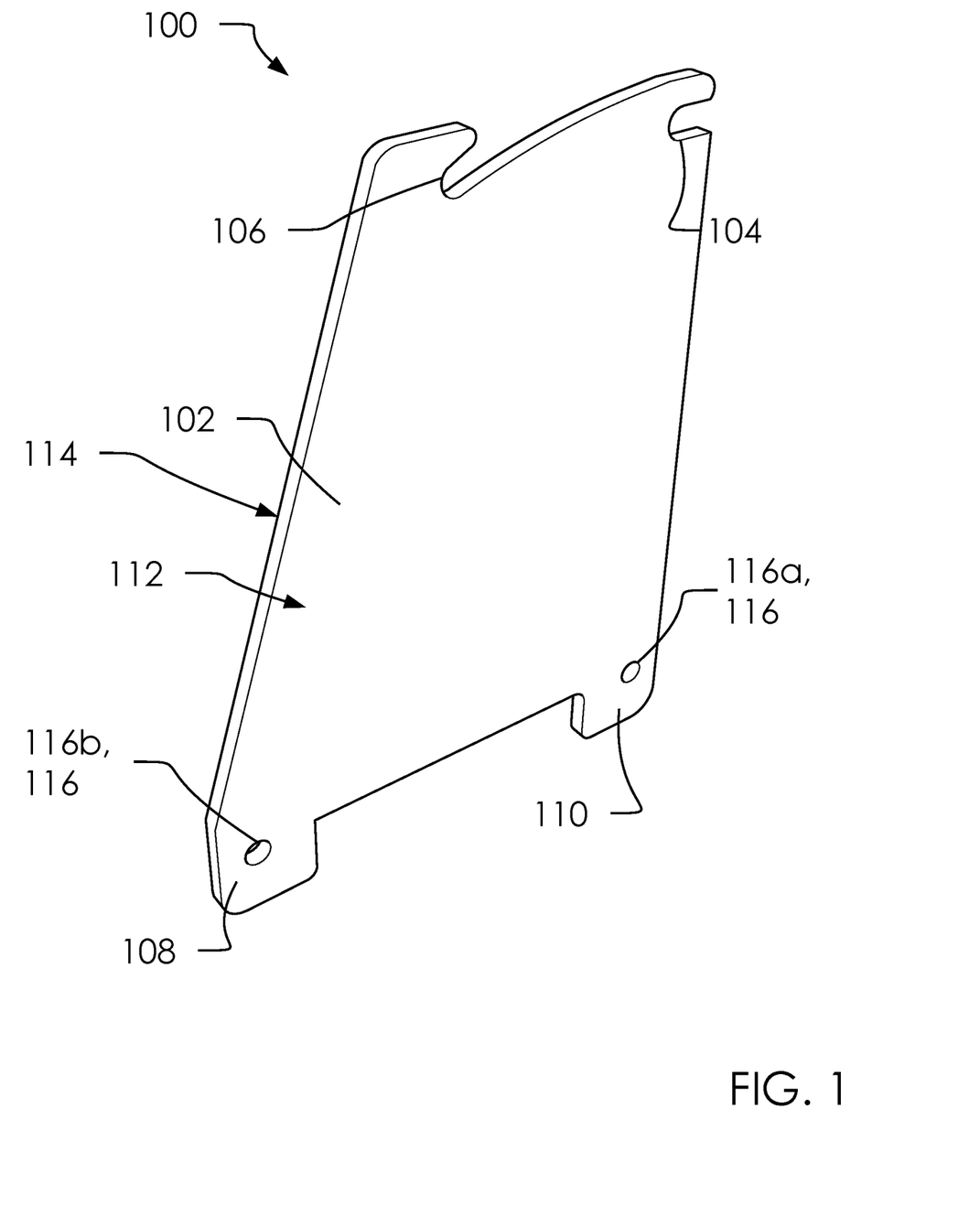
FIG. 1 illustrates a perspective overview of a guard plate 102.

FIG. 1 illustrates a perspective overview of a guard plate 102.

In one embodiment, said guard plate 102 can comprise a plate body 102, a first upper indention 104, a second upper indention 106, a first lower extension 108, a second lower extension 110, a front side 112, a back side 114, a two lower bolt holes 116 (which can comprise a first lower bolt hole 116a, and a second lower bolt hole 116b).

In one embodiment, said guard plate 102 can be used to protect a vehicle's fluid portal, as disclosed herein.

Figure 2:
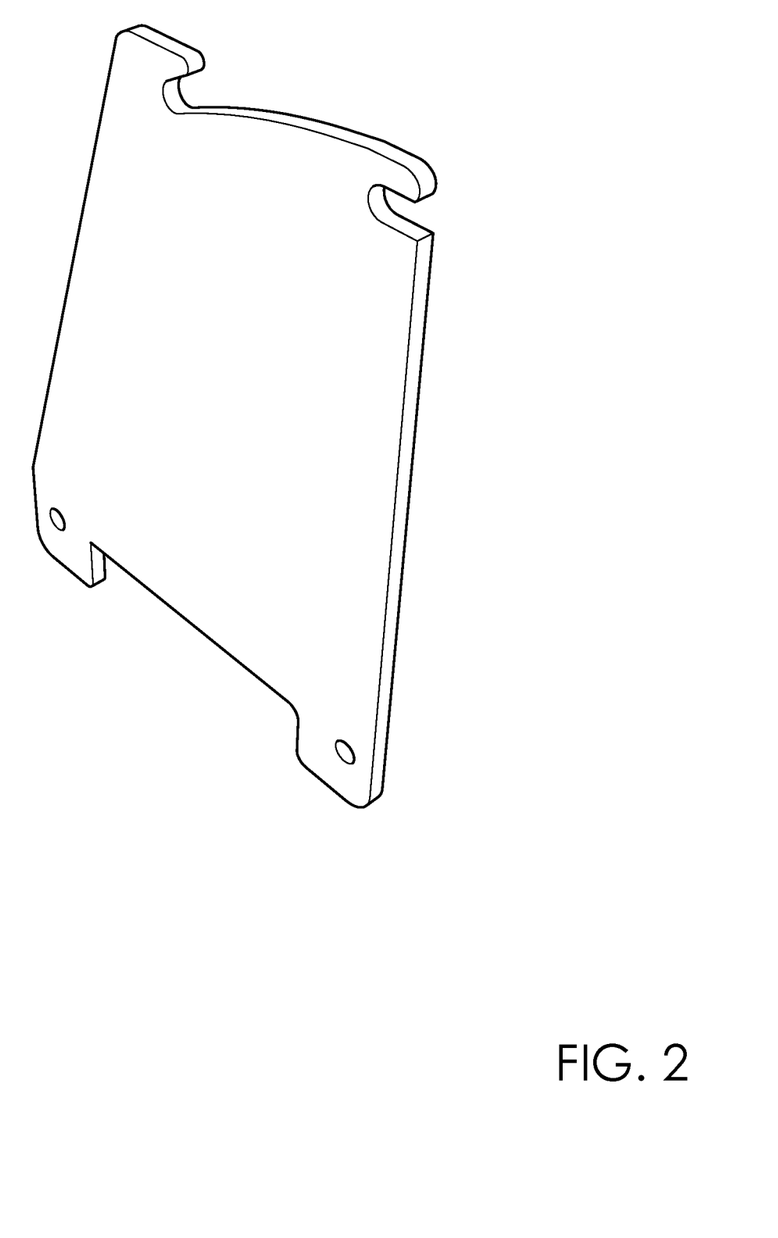
FIG. 2 illustrates a perspective overview of said guard plate 102.

FIG. 2 illustrates a perspective overview of said guard plate 102.

Figure 3:
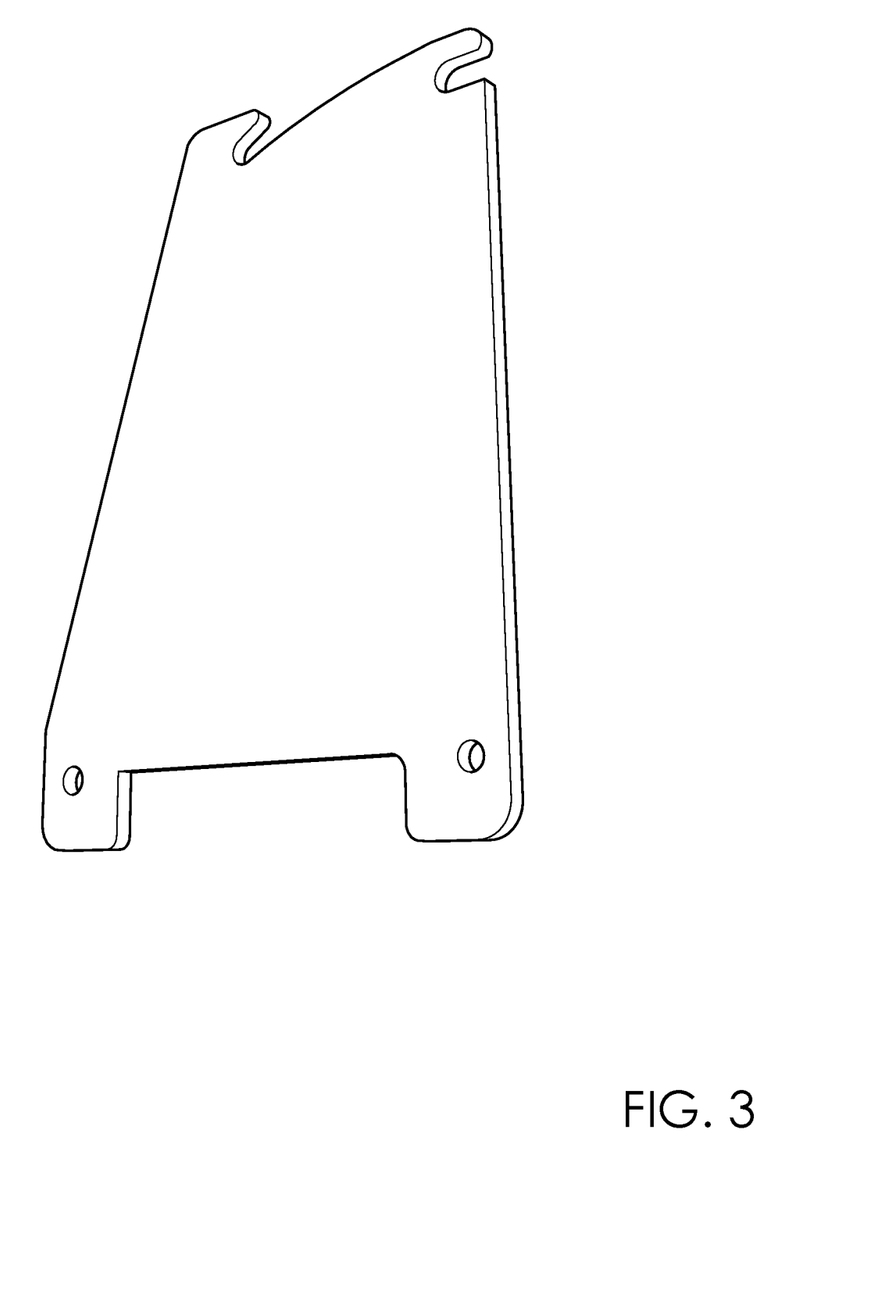
FIG. 3 illustrates a perspective lower front view of said guard plate 102.

FIG. 3 illustrates a perspective lower front view of said guard plate 102.

Figure 4:
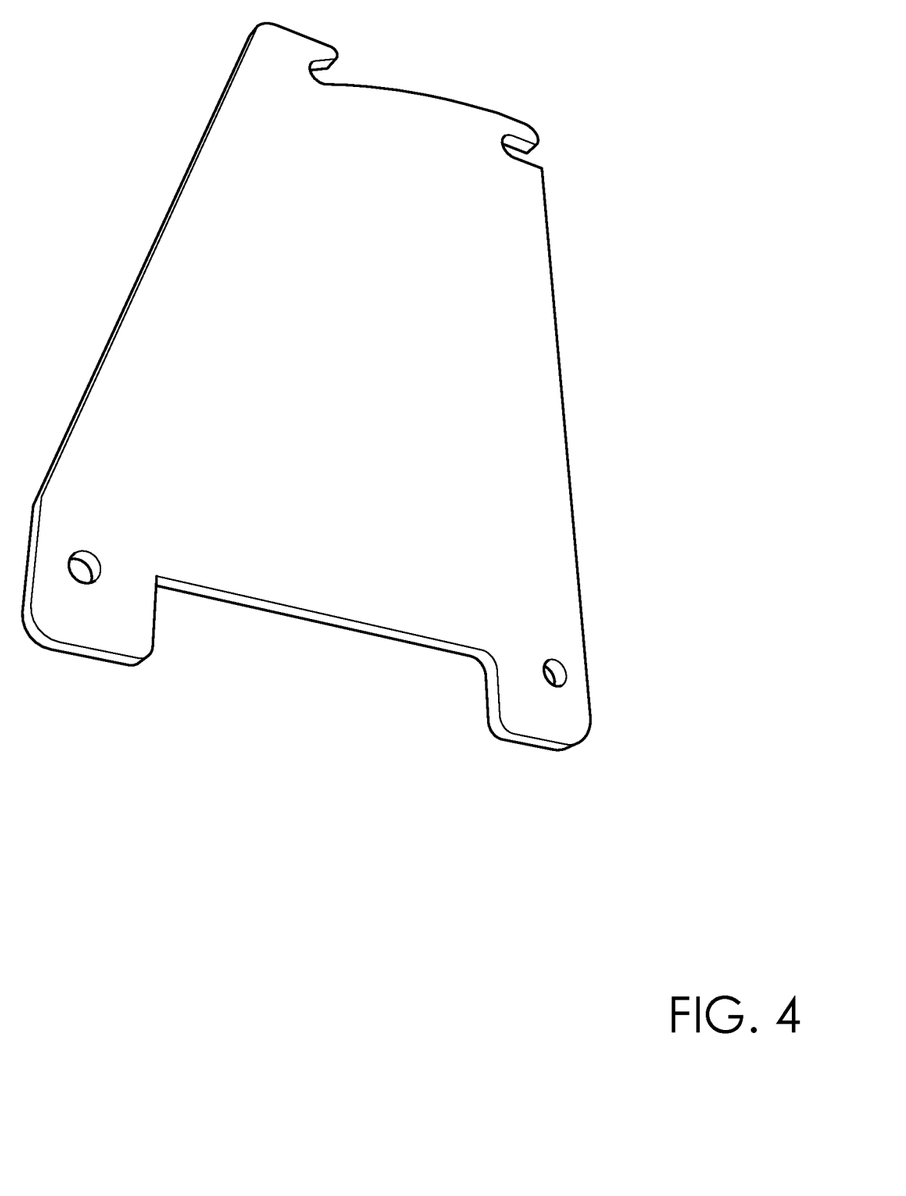
FIG. 4 illustrates a perspective lower front view of said guard plate 102.

FIG. 4 illustrates a perspective lower front view of said guard plate 102.

Figure 5A:
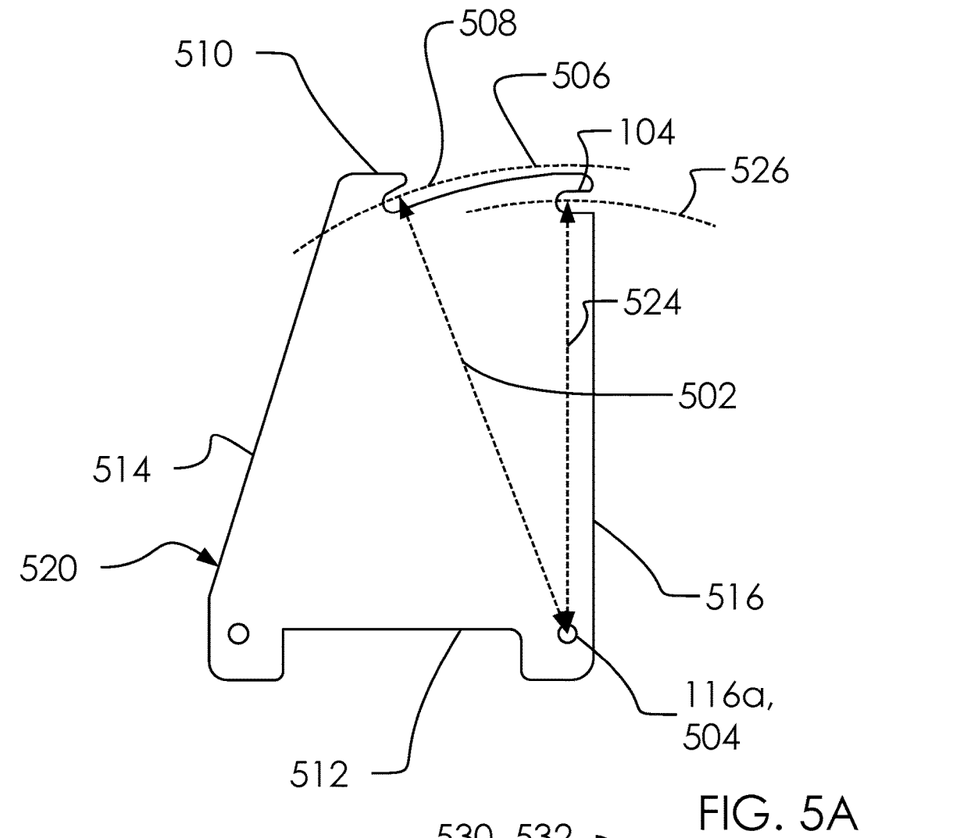
FIGS. 5A and 5B illustrate an elevated front view of said guard plate 102, and a detailed view thereof.
Figure 5B:
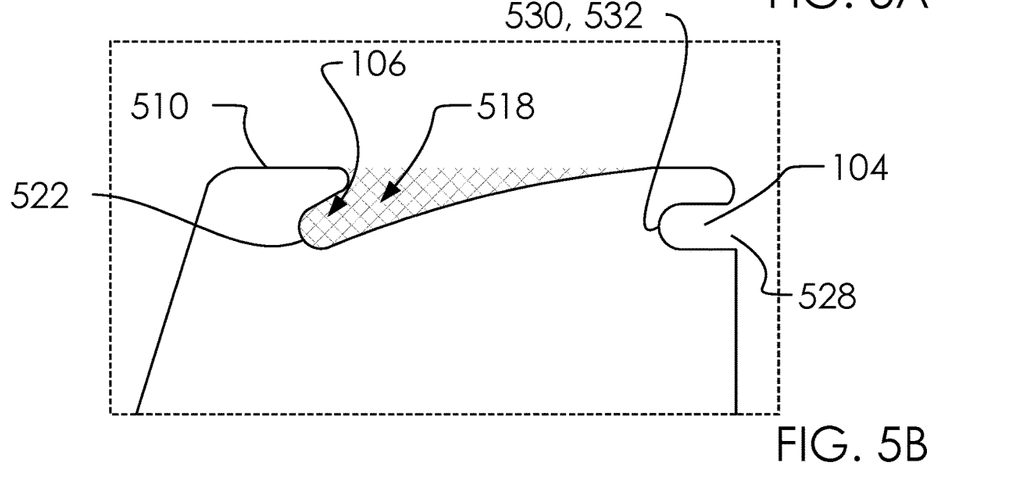

FIGS. 5A and 5B illustrate an elevated front view of said guard plate 102, and a detailed view thereof.

In one embodiment, said guard plate 102 can comprise a rotational radius 502, a rotational origin 504, a curved top edge 506, a centered rotational radius 508, a fastener catching extension 510, a lower edge 512, a first side edge 514 and a second side edge 516. Further, a space between said curved top edge 506 and said fastener catching extension 510 can comprise a fastener indention 518. Further, a second rotational radius 524 can define a distance between said rotational origin 504 (which can comprise said first lower bolt hole 116a) and a center point of said second upper indention 106.

In one embodiment, a second rotational path 526 can be defined as a rotated arch around said rotational origin 504 and said second rotational radius 524. Likewise, said centered rotational radius 508 can comprise a rotated arch around said rotational origin 504 and said rotational radius 502.

Said second upper indention 106 can comprise a slotted opening in said second side edge 516 open to a first side 528 along said second rotational path 526 and closed on a second side 530 with a second fastener catch 532.

In one embodiment, said guard plate 102 can be configured to allow said plate body 102 to rotate around a second upper fastener 708b below a first upper fastener 708a to selectively cover and uncover a protected surface 520.

In one embodiment, said plate body 102 is selectively held against a portion of said protected surface 520 with said second upper fastener 708b through said first lower bolt hole 116a; said second upper fastener 708b is loosened to allow said plate body 102 to rotate; said first upper fastener 708a is loosened to allow said plate body 102 to rotate away from said first upper fastener 708a; said curved top edge 506 follows said rotational radius 502 to ensure said first upper fastener 708a can pass around without getting caught.

In one embodiment, said curved top edge 506 can comprise said fastener catching extension 510 extending up at said first upper indention 104 and forming a fastener catch 522. Said fastener catch 522 can comprise at least a half circular cut out from said fastener catching extension 510 which can selectively receive and hold a portion of said first upper fastener 708a.

Said first upper fastener 708a can selectively hold or release said plate body 102 at said first upper indention 104. Likewise, a first lower fastener 712a can selectively hold or release said plate body 102 at said second upper indention 106. Said second upper indention 106 can comprise at least a half circular cut out from said second side edge 516.

Figure 6:
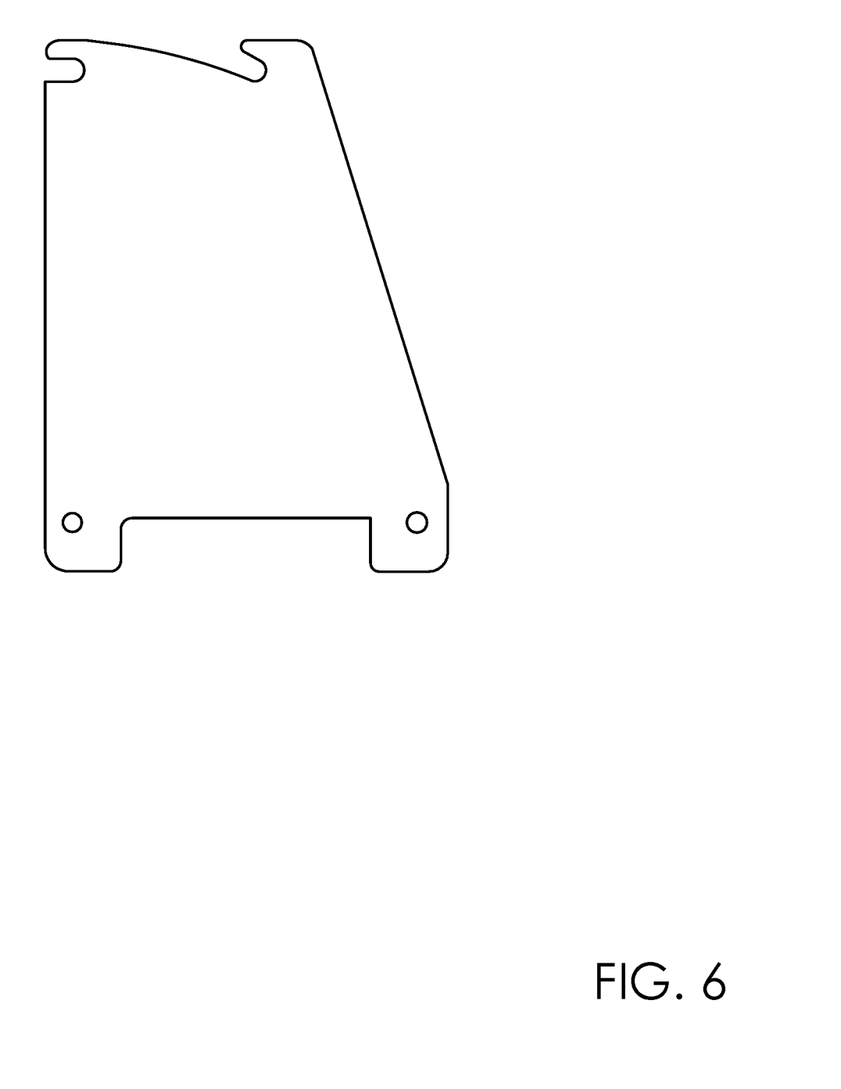
FIG. 6 illustrates an elevated backside view of said guard plate 102.

FIG. 6 illustrates an elevated backside view of said guard plate 102.

Figure 7A:
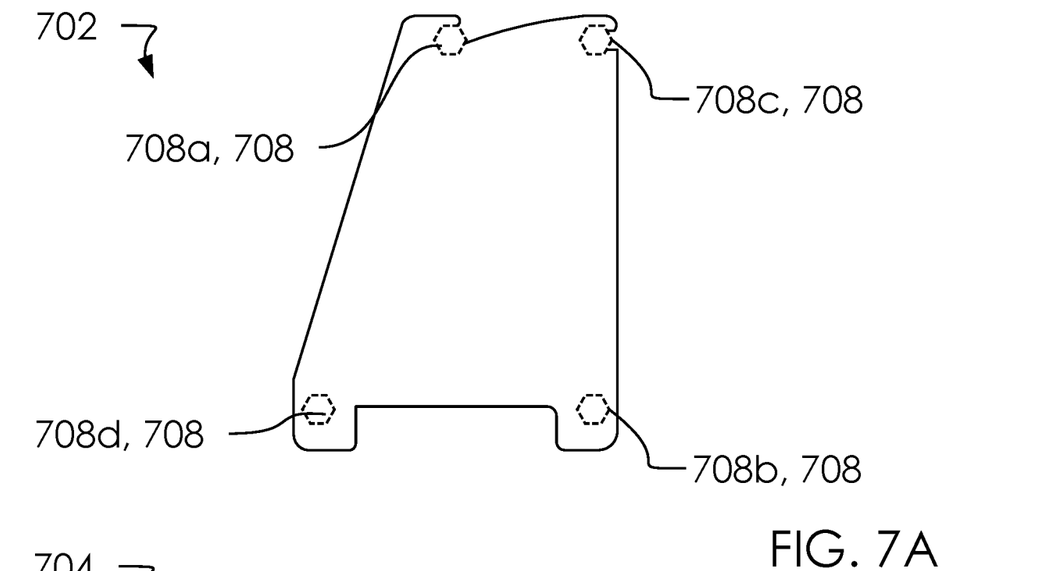
FIGS. 7A, 7B and 7C illustrate an elevated front view of said guard plate 102 in an attached configuration 702, a second configuration 704, and a partially detached configuration 706.
Figure 7B:
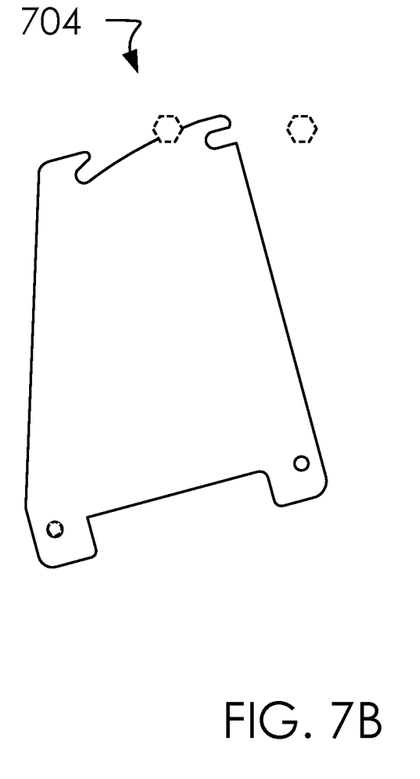
Figure 7C:
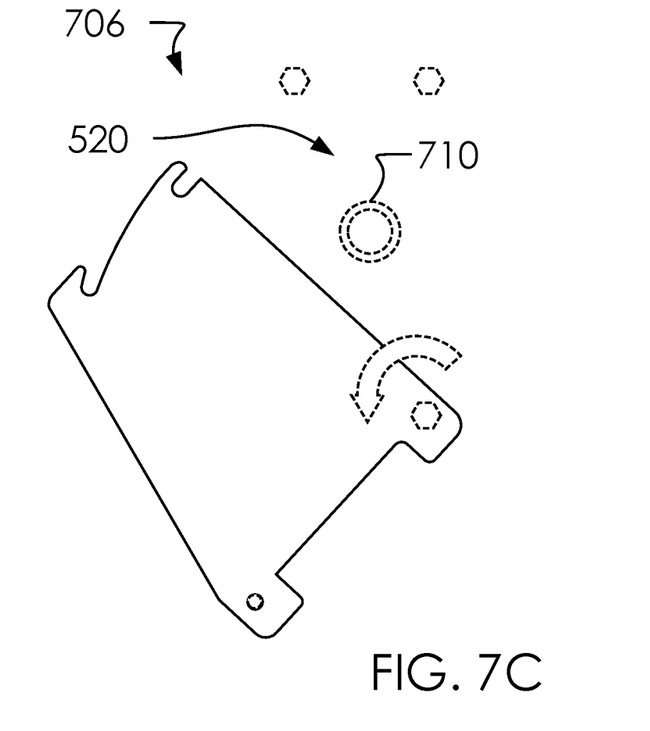

FIGS. 7A, 7B and 7C illustrate an elevated front view of said guard plate 102 in an attached configuration 702, a second configuration 704, and a partially detached configuration 706.

In one embodiment, said guard plate 102 can selectively attach to a plurality of fasteners 708 (which can comprise said first upper fastener 708a, said second upper fastener 708b, said first lower fastener 712a, and a second lower fastener 712d), to cover a liquid additive portal 710.

In one embodiment, revealing said protected surface 520 and/or said liquid additive portal 710 can comprise loosening said first lower fastener 712a, said second upper fastener 708b, and said first upper fastener 708a, and removing said second lower fastener 712d (if included at all), then rotating said plate body 102 down on said rotational origin 504.

In one embodiment, said liquid additive portal 710 can be on said protected surface 520. In one embodiment, said liquid additive portal 710 can receive maintenance fluids, but said guard plate 102 can discourage users from accidentally adding fuels into said liquid additive portal 710 and thereby protect a vehicle such as a UTV, skid loader, or similar. In one embodiment, maintenance fluids can comprise diesel exhaust fluids which can be required due to statutory regulations.

The current system is designed to slow down users just enough to prevent adding of fuels into said liquid additive portal 710. This can save a vehicle owner lots of money. For example, insertion of diesel into a DEF portal can cause $20,000 of damage to a vehicle.

Another advantage of said guard plate 102 is that it can be removed without unnecessary effort by simply removing two fasteners, and loosening two others, as illustrated. Accordingly, said guard plate 102 provides the correct amount of inconvenience when adding fuel, and little inconvenience when adding maintenance fuels.

The following sentences are included with reference to the claims below for completeness:

Said guard plate 102 for selectively covering said protected surface 520. Said guard plate 102 comprises said plurality of fasteners 708, and said plate body 102. Said plate body 102 comprises said fastener catch 522, said fastener indention 518, said second side edge 516, said first side edge 514, said lower edge 512, said fastener catching extension 510, said curved top edge 506, said rotational origin 504, said rotational radius 502, said first lower bolt hole 116a, said back side 114, said front side 112, said first upper indention 104, said second upper fastener 708b, and said first upper fastener 708a. Said guard plate 102 can be configured to allow said plate body 102 to rotate around said second upper fastener 708b below said first upper fastener 708a to selectively cover and uncover said protected surface 520. Said plate body 102 can be selectively held against a portion of said protected surface 520 with said second upper fastener 708b through said first lower bolt hole 116a. Said second upper fastener 708b can be loosened to allow said plate body 102 to rotate. Said first upper fastener 708a can be loosened to allow said plate body 102 to rotate away from said first upper fastener 708a. Said curved top edge 506 follows said rotational radius 502 to ensure said first upper fastener 708a can pass around without getting caught. Said curved top edge 506 comprises said fastener catching extension 510 extending up at said first upper indention 104 and forming said fastener catch 522. Said fastener catch 522 comprises at least a half circular cut out from said fastener catching extension 510 which selectively receives and holds a portion of said first upper fastener 708a to selectively hold or release said first upper fastener 708a to said first upper indention 104. Said liquid additive portal 710 of a vehicle can be on said protected surface 520. Said liquid additive portal 710 can receive maintenance fluids, but said guard plate 102 can discourage users from accidentally adding fuels into said liquid additive portal 710 and thereby protect said vehicle. Said guard plate 102 further comprises said first lower fastener 712a. Said plate body 102 further comprises said second upper indention 106. Said second upper indention 106 comprises a slotted opening in said second side edge 516 open to said first side 528 along said second rotational path 526 and closed on said second side 530 with said second fastener catch 532. Said second rotational radius 524 can define a distance between said rotational origin 504 and a center point of said second upper indention 106. exposing said liquid additive portal 710 can further comprise loosening said second upper fastener 708b and rotating said plate body 102 around said rotational origin 504 away from said second upper fastener 708b.

Said guard plate 102 for selectively covering said protected surface 520. Said guard plate 102 comprises said plurality of fasteners 708, and said plate body 102. Said plate body 102 comprises said fastener catch 522, said fastener indention 518, said second side edge 516, said first side edge 514, said lower edge 512, said fastener catching extension 510, said curved top edge 506, said rotational origin 504, said rotational radius 502, said first lower bolt hole 116a, said back side 114, said front side 112, said first upper indention 104, said second upper fastener 708b, and said first upper fastener 708a. Said guard plate 102 can be configured to allow said plate body 102 to rotate around said second upper fastener 708b below said first upper fastener 708a to selectively cover and uncover said protected surface 520. Said plate body 102 can be selectively held against a portion of said protected surface 520 with said second upper fastener 708b through said first lower bolt hole 116a.

Said second upper fastener 708b can be loosened to allow said plate body 102 to rotate. Said first upper fastener 708a can be loosened to allow said plate body 102 to rotate away from said first upper fastener 708a.

Said guard plate 102 further comprises said first lower fastener 712a. Said plate body 102 further comprises said second upper indention 106. Said second upper indention 106 comprises a slotted opening in said second side edge 516 open to said first side 528 along said second rotational path 526 and closed on said second side 530 with said second fastener catch 532. Said second rotational radius 524 can define a distance between said rotational origin 504 and a center point of said second upper indention 106. exposing said liquid additive portal 710 can further comprise loosening said second upper fastener 708b and rotating said plate body 102 around said rotational origin 504 away from said second upper fastener 708b.

Said curved top edge 506 follows said rotational radius 502 to ensure said first upper fastener 708a can pass around without getting caught. Said curved top edge 506 comprises said fastener catching extension 510 extending up at said first upper indention 104 and forming said fastener catch 522.

Said fastener catch 522 comprises at least a half circular cut out from said fastener catching extension 510 which selectively receives and holds a portion of said first upper fastener 708a to selectively hold or release said first upper fastener 708a to said first upper indention 104.

Said liquid additive portal 710 of a vehicle can be on said protected surface 520. Said liquid additive portal 710 can receive maintenance fluids, but said guard plate 102 can discourage users from accidentally adding fuels into said liquid additive portal 710 and thereby protect said vehicle.

Said guard plate 102 further comprises said first lower fastener 712a. Said plate body 102 further comprises said second upper indention 106. Said second upper indention 106 comprises a slotted opening in said second side edge 516 open to said first side 528 along said second rotational path 526 and closed on said second side 530 with said second fastener catch 532. Said second rotational radius 524 can define a distance between said rotational origin 504 and a center point of said second upper indention 106. exposing said liquid additive portal 710 can further comprise loosening said second upper fastener 708b and rotating said plate body 102 around said rotational origin 504 away from said second upper fastener 708b.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A guard plate for selectively covering a protected surface, wherein:
   said guard plate comprises a plurality of fasteners, a plate body;
   said plate body comprises a first side edge, a second side edge, a curved top edge, a lower edge, a back side, a front side,
   said guard plate comprises at least a first lower bolt hole arranged along said lower edge of said guard plate;
   proximate to said curved top edge, said guard plate comprises a first upper indention and a second upper indention, each configured to receive a portion of a first upper fastener and a second upper fastener, respectively;
   said guard plate comprises a rotational origin created by rotating said guard plate around a first lower fastener in said first lower bolt hole;
   said guard plate comprises a rotational radius and a second rotational radius corresponding to a distance between said first lower bolt hole and said first upper fastener and said second upper fastener, respectively;
   said first upper indention comprises a fastener indention in a portion of said guard plate, aligned with said rotational radius and configured to receive said first upper fastener as said guard plate rotates around said rotational origin;
   said second upper indention comprises said fastener indention in a portion of said guard plate, aligned with said second rotational radius and configured to receive said second upper fastener as said guard plate rotates around said rotational origin; and said guard plate is selectively held against said protected surface with one or both of said first upper fastener and said second upper fastener through said first upper indention and said second upper indention and tightened down, in addition to said first lower fastener secured through said first lower bolt hole.

2. The guard plate of claim 1, wherein:

said second upper fastener is loosened to allow said plate body to rotate; and said first upper fastener is loosened to allow said plate body to rotate away from said first upper fastener.

3. The guard plate of claim 1, wherein:

said curved top edge follows said rotational radius to ensure said first upper fastener can pass around without getting caught; and said curved top edge comprises a fastener catching extension extending up at said first upper indention and forming a fastener catch.

4. The guard plate of claim 3, wherein:

said fastener catch comprises at least a half circular cut out from said fastener catching extension which selectively receives and holds a portion of said first upper fastener to selectively hold or release said first upper fastener to said first upper indention.

5. The guard plate of claim 3, wherein:

a liquid additive portal of a vehicle is on said protected surface; and said liquid additive portal is configured to receive maintenance fluids but said guard plate is configured to discourage users from accidentally adding fuels into said liquid additive portal and thereby protect said vehicle.

* * * * *